United States Patent [19]

de Keijzer

[11] Patent Number: 4,479,188
[45] Date of Patent: Oct. 23, 1984

[54] DIGITAL DETECTOR FOR A MULTI-FREQUENCY CODE IN AN ANALOG SIGNAL

[75] Inventor: Johannes de Keijzer, Zoetermeer, Netherlands

[73] Assignee: Staat der Nederlanden (Staatsbedrijf der Posterijen, Telegrafie en Telefonie), The Hague, Netherlands

[21] Appl. No.: 411,241

[22] Filed: Aug. 25, 1982

Related U.S. Application Data

[63] Continuation-in-part of Ser. No. 143,191, Apr. 24, 1980, abandoned.

[30] Foreign Application Priority Data

May 2, 1979 [NL] Netherlands .......................... 7903462

[51] Int. Cl.³ .......................... G06F 15/34; G01S 9/23
[52] U.S. Cl. ................................. 364/484; 179/84 VF; 364/604; 364/726
[58] Field of Search ............... 364/604, 726, 484, 487, 364/728; 179/84 VF

[56] References Cited

U.S. PATENT DOCUMENTS

| | | | |
|---|---|---|---|
| 3,636,333 | 1/1972 | Klund | 364/726 |
| 3,881,101 | 4/1975 | Pederson et al. | 364/728 |
| 4,038,540 | 7/1977 | Roberts | 364/728 |
| 4,088,960 | 5/1978 | Osborne | 364/487 X |
| 4,100,378 | 7/1978 | Claasen et al. | 364/728 |
| 4,185,172 | 1/1980 | Melindo | 364/728 |
| 4,370,726 | 1/1983 | Caracappa | 364/604 |

*Primary Examiner*—Felix D. Gruber
*Attorney, Agent, or Firm*—Hugh Adam Kirk

[57] ABSTRACT

This disclosure concerns a system for digitally detecting one or more of a plurality of fixed frequencies in an analog signal according to a correlation method, the fixed frequencies occurring in a first group and in a second group wherein a third harmonic of one or more frequencies of the first group is equal or almost equal to a frequency of the second group. Each of the frequencies of the first group are represented by a sequence of six equidistant pulses per period, which pulses have the values $+1$, $+1$, $0$, $-1$, $-1$ and $0$, respectively; and the frequencies of the second group are represented by a sequence of two equidistant pulses per period, which pulses have the values $+1$ and $-1$, respectively. All these reference pulses can be stored in a reference memory (5) which is read out at a frequency whose value is equal to the product of the number of memory places in the reference memory, and the frequency which is the highest common factor of the frequencies to be detected.

2 Claims, 5 Drawing Figures

MFC DETECTOR CIRCUIT.

CHARGING PULSES

CLOCK PULSES (3)

MEMORY STORE (5)

DIGITAL DETECTOR FOR A MULTI-FREQUENCY CODE IN AN ANALOG SIGNAL

This is a continuation-in-part application of U.S. patent application Ser. No. 143,191 filed Apr. 24, 1980, now abandoned.

BACKGROUND OF THE INVENTION

The invention relates to a device for digitally detecting one or more of a plurality of fixed frequencies in an analog signal according to a correlation method, the fixed frequencies occurring in a first group of lower frequency tones and in a second group of higher frequency tones, and wherein the third harmonic of one or more frequencies of the first group is equal or almost equal to a frequency of the second group.

Similar devices are generally known and are used particularly for detecting MFC (mult-frequency code)-signalling between telephone exchanges.

The object of the invention is to provide a device of the sort described, but with a greater reliability than the known devices, and offering the possibility of making the detection in a relatively short time, use being made of the method already known from the Proudfoot U.S. Pat. No. 3,882,283 issued May 6, 1975.

A problem attendant on devices of the sort is that by making use of the correlation principle known from said Proudfoot patent, the detection of odd harmonics takes place because the reference signals are stored as square-wave voltages. When one of the frequencies of the second group is equal or almost equal to an odd harmonic of one of the frequencies of the first group, the frequency of the second group can be detected as the frequency of the first group. In order to prevent this, the correlation time is extended according to a known technique, due to which a better discrimination of the correlation products for each of the frequencies can be achieved. This extension of the correlation time is poorly compatible with the desirability of a time-division use of the detection device.

SUMMARY OF THE INVENTION

The device according to the invention does not have this problem and is based on the unexpected discovery that correlating the received signal only with a small number of pulses at a higher frequency, accurate detection can be had in a relatively short time, as well as avoiding detection of confusing third harmonics of the lower group of signals. For that purpose the device according to the invention is characterized by a reference memory in which are stored the reference pulse series containing six equidistant pulses per period or cycle for each of the twelve (six sine and six cosine) frequencies of the first group, which pulses have the values +1, +1, 0, −1, −1 and 0, respectively, and containing a two equidistant pulses per period or cycle for the twelve (six sine and six cosine) frequencies of the second group, which pulses have the values +1 and −1, respectively. The frequencies to be detected are determined by means for reading the reference memory at a frequency, the value of which reading frequency is equal to the product of the number of memory places in the reference memory and the frequency which is the highest common factor of the frequencies to be detected.

According to a second characteristic of this invention, said reference pulse series in the reference memory are controlled by a dock and gating circuit so that these pulses are outputted to be equally spaced in each period of a whole number of periods of each of the frequencies to be detected.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I represents a schematic block wiring diagram of a preferred embodiment of a device according to this invention;

FIG. II shows time wave forms of a reference series of the first group of frequencies;

FIG. III shows time wave forms of a reference series of the second group of frequencies, FIG. IV shows time pulse wave forms of the manner how a reference series is adapted to an equidistant frame; and FIG. V is a wave form and chart of how a desired frequency signal can be detected from an undesired frequency signal according to the method of this invention.

DETAILED DESCRIPTION OF A PREFERRED EMBODIMENT

Figure 1:
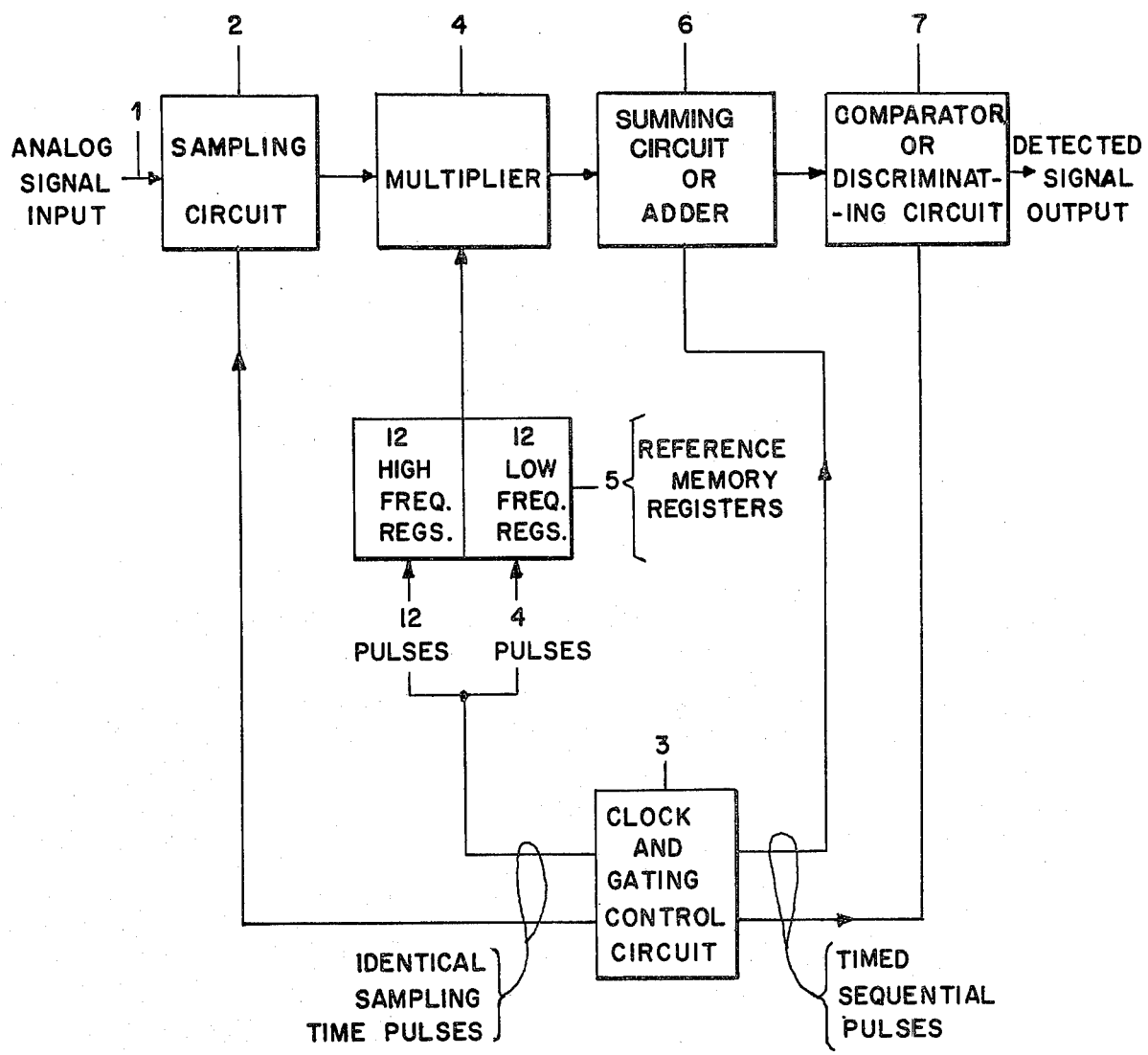
Figures 2, 3:
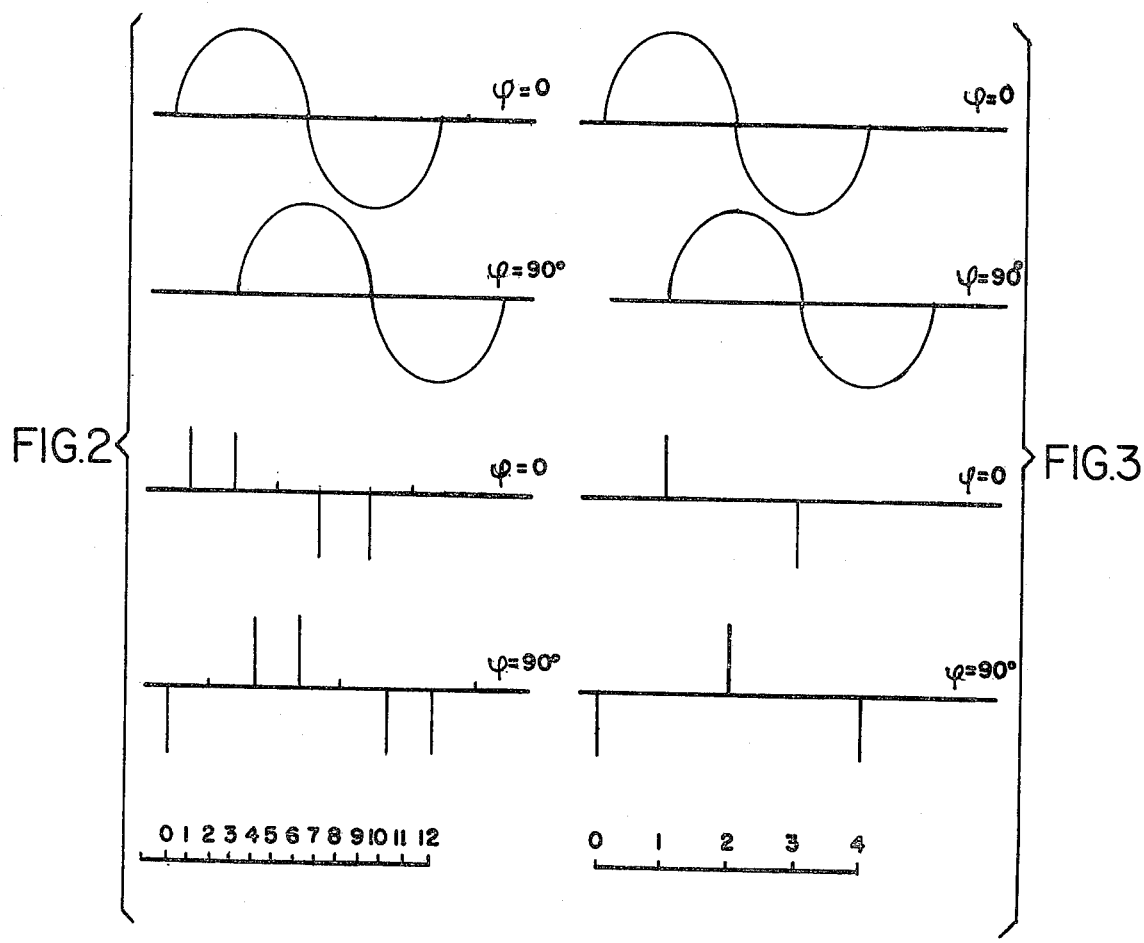
Figure 4:
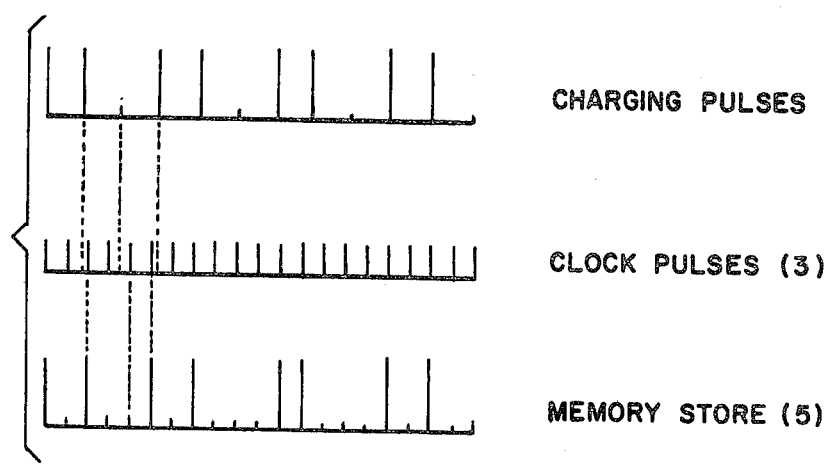
Figure 5:
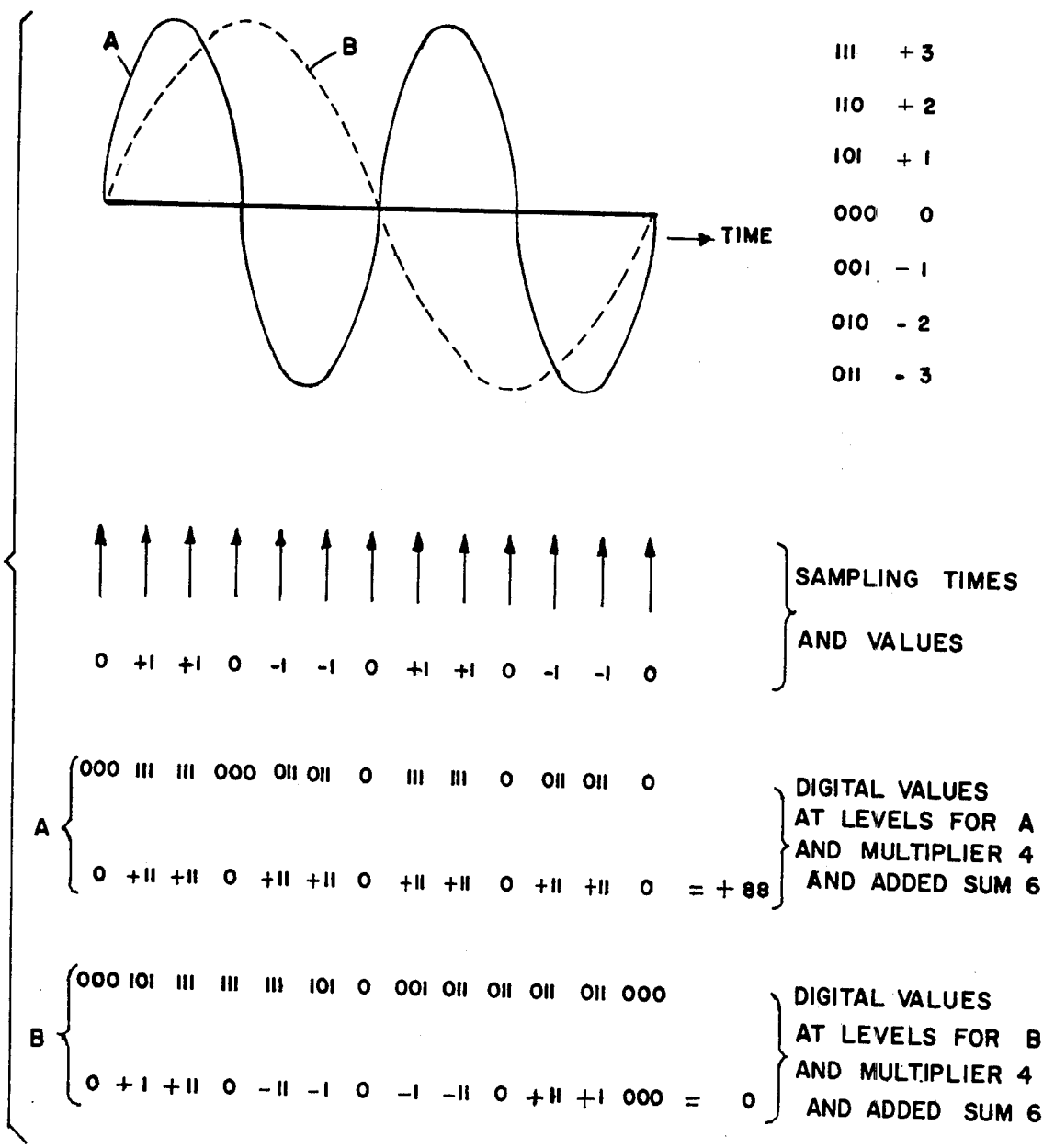

The signal to be investigated is applied to an input 1 in FIG. I. In a sampling circuit 2, which is an analog-digital or A/D converter, the analog signal is sampled and quantized under the control of a clock pulse and gating control circuit 3, which control circuit 3 generates the same equidistant pulses from all four of its outputs. The quantization takes place on seven levels, to wit −3, −2, −1, 0, +1, +2, +3 or digitally 011, 010, 001, 000, 101, 110, and 111, respectively, as shown in FIG. V. These seven levels are passed on in a coded form to a multiplier 4, which multiplier 4 is the same as an adder when operating on digital signals such as a three-bit word. Next the multiplier 4 multiplies the coded signal by reference signals stored in a reference or read-only memory (ROM) memory 5. This memory 5 is divided into two parts of twelve registers each, one part for the group of six lower frequency signals, and the other part for the group of six higher frequency signals, each part having six registers for the sine and six for the cosine of each signal, that is the memory 5 comprises only 24 registers in all. Thus, the samples taken from the incoming analog signals are multiplied with the samples from the memory registers in the multiplier circuit 4, and they increase in a straight line until a certain level is obtained, the timing of which increase is determined from the clock control circuit 3 through the adder 6. For each of the frequencies to be detected, the products of this multiplication are passed on to an adder or integrator 6 composed of twenty-four integrators, collecting the products or adding the results of the multiplier 4 during a fixed period of time under the control of the control circuit 3. At the end of this fixed period of time, a discriminating or comparator circuit 7 determines which of the frequencies received in the incoming signal generates the highest value or maximum output and passes this result to the circuit that follows, thus detecting which ones of the twelve signal frequencies are received in pairs successively at the input 1. In the embodiment described, this takes place in the way as shown from said Proudfoot patent by squaring the correlation results of the quantized signal with the sine reference series and with the cosine reference series, respectively, and by adding up the two squares.

In FIG. V there is schematically shown with two wave forms, namely a full line of a desired detected wave A and dotted line of a different frequency undesired detected wave B, each of which waves are separately scanned at the sampling times indicated by the first row of upwardly pointed arrows along the horizontal time row of the wave forms A and B, and the digital value of the levels of the waves are indicated in the first rows of parts A and B of FIG. V. These samples are multiplied in the multiplier 4 by the values +1, +1, 0, −1, −1, 0 for the lower frequency signals in Group 1, and their digital results are shown in the second line of digital values in part A, which results when added together amount to the number +88 as shown, in that all eight of the "11" values are positive. On the other hand, when the digital values of the levels at the same sampling times for wave B are multiplied by the corresponding sampling time values, digital values are obtained in the last row of FIG. V which when added up amount to 0, which is a much lesser or lower value or output, and thus wave B would not be detected as a desired frequency signal. This is merely illustrative of how waves of different frequencies can be discriminated from the waves of the desired frequencies stored in the registers of the reference memory 5.

The working of the multiplier 4, the memory 5, the integrator or adder 6 and the discriminating or comparator circuit 7 is generally known, and more particularly they correspond, respectively, to: the sign gate and counter 19 and 20, the stored sequence generator 18, the accumulators 21, 22 and the comparator 26, all in said Proudfoot U.S. Pat. No. 3,882,283 issued May 6, 1975. The workings of these circuits also correspond to the disclosure in applicant's assignee's copending U.S. patent application Ser. No. 068,406 filed on Aug. 21, 1979, now Bos et al U.S. Pat. No. 4,279,017 issued July 14, 1981.

According to the invention, the number of bits in the reference memory 5 is greatly reduced with regard to the known technique, thus making it possible to let the detection take place in a shorter time and to use the detection device by time-divison for several MFC-channels, during the same time required previously for detecting the signals in one channel.

According to CCITT Recommendation Q 441 a first group of six frequencies, to wit 540, 660, 780, 900, 1020 and 1140 Hz, and a second group of six frequencies in a higher band, to wit 1380, 1500, 1620, 1740, 1860 and 1980 Hz are used for MFC-signalling. As the detection of odd harmonics is introduced, when making use of the correlation principle, as indicated above, it will be necessary that, for the reference signals of the frequencies of the low band, measures are taken to prevent the third harmonic from being too strongly present in the correlation product, since the third harmonic of some of these frequencies falls within the frequency range of the higher band, such as for example: $3 \times 540 = 1620$, and $3 \times 660 = 1980$.

According to the invention, reference signals comprising six equidistant pulses per period, successively having the values +1, +1, 0, −1, −1, and 0 are used for the lower frequencies to avoid detection of the third harmonics of the group of lower frequency signals by which signals of the second group could be detected as signals of the first group. As the correlation process requires a sine reference signal and a cosine reference signal, twelve positions per period will be needed to make the two reference signals for a frequency of the lower band fit in an equidistant frame (FIG. II). The reference signals for the frequencies of the high band contain only two equidistant pulses with the values +1 and −1 per period. With these frequencies the harmonics fall outside the band in which the frequencies to be detected occur. Hence four pulse positions per period (FIG. III) will be sufficient for this group of frequencies.

The quality of the result of the correlation process depends on the duration of this process. An optimum is obtained when a whole number of periods of each of the frequencies to be detected present itself in the correlation time. In that case, for each of the frequencies to be detected a maximum result is obtained from the correlation if the signal to be investigated contains this frequency, whereas the result is minimal if the signal contains the remaining frequencies.

The device according to the example as a correlation time of $16\frac{2}{3}$ ms, because this is the minimum time in which an equidistant frame with a whole number of periods for each of said frequencies can be read.

All the needed reference signals have been recorded in a coded form in the reference memory 5. For each of the twelve frequencies two reference series have been stored; for the group of lower frequencies each series contains twelve pulse positions per period, and for the group of higher frequencies four pulse positions per period. For said correlation time of $16\frac{2}{3}$ ms, the maximum number of pulse positions is found for the frequency of 1140 Hz, to wit $$\frac{16\frac{2}{3} \times 1140 \times 12}{1000} = 228.$$

According to the invention twelve different pulse series of the frequencies to be detected are arranged in one fixed assembly, block or frame of equally spaced pulses to keep the reference memory 5 as simple as possible. How the distance between the pulse has to be adapted somewhat for that purpose is shown by FIG. IV. Each pulse of the reference series is stored in the nearest position to the equidistant pulses in the frame. For practical reasons a frame of 256 bits in $16\frac{2}{3}$ ms has been chosen. As the coding of each pulse requires two bits and each frequency needs two pulse series (sine and cosine), a memory of $256 \times 48$ bits will suffice for the reference memory 5. The reading frequency of this memory amounts to $256 \times 60 = 15360$ Hz. Moreover, a very reliable digital detection device for analog signals is obtained by having the signal applied to the input 1 sampled at said frequency.

While there is described above the principles of this invention in connection with specific apparatus, it is to be clearly understood that this description is made only by way of example and not as a limitation to the scope of this invention.

I claim:

1. An apparatus for digitally detecting one or more of a plurality of fixed frequencies which are present in an incoming signal according to the correlation method, the fixed frequencies occurring in a first group of lower frequencies and in a second group of higher frequencies, said apparatus comprising:

(a) means (2) for sampling the incoming analog signal of said fixed frequencies, (b) a reference memory means (5) having separate registers in which are stored sine reference code number pulses and a cosine reference code number pulses for a whole number of periods of each of the frequencies to be detected, the lower group of frequencies having six code number pulses per period which pulses have the values of $+1, +1, 0, -1, -, 0$, and in the higher group of frequencies having two pulses per period, which pulses have the values of 30 1 and $-1$, (c) means (4) for the multiplication of the samples of said incoming signals with said reference code number pulses, (d) means (6) for adding the resulting multiplication products, (c) means (7) for comparing and selecting the highest valued multiplied product as corresponding to the frequency to be detected, and (f) a clock pulse and control circuit (3) means for controlling all of the above mentioned means including sampling the analog input signal at frequency the value of which is equal to a product of the number of code number pulses in said reference memory means and the frequency which is the highest common factor of the frequencies to be detected, and reading out said reference memory means said sine-cosine values at said sampling frequency.

2. An apparatus according to claim 1 including means for reading out said number code pulses from said reference memory means at equally spaced intervals per whole period of the frequencies to be detected.

* * * * *

United States Patent and Trademark Office
CERTIFICATE OF CORRECTION

PATENT NO. : 4,479,188
DATED : October 23, 1984
INVENTOR(S) : Johannes de Keijzer It is certified that error appears in the above—identified patent and that said Letters Patent are hereby corrected as shown below:

Column 1, line 59, omit "a".

Column 4, line 44, change "pulse" to - - pulses - - .

Column 5, line 11, after the second "-" insert - - 1 - - .

Column 5, line 13, change "30" to - - + - - .

Column 6, line 1, change "(c)" to - - (e) - - .

Signed and Sealed this

Thirtieth Day of April 1985

[SEAL]

Attest:

DONALD J. QUIGG

Attesting Officer     Acting Commissioner of Patents and Trademarks